United States Patent
Zhou et al.

(10) Patent No.: US 11,434,418 B1
(45) Date of Patent: Sep. 6, 2022

(54) STRONG ACID PRECURSOR GENERATING STRONG ACID FOR USE DOWNHOLE IN A SUBTERRANEAN FORMATION

(71) Applicant: Halliburton Energy Services, Inc., Houston, TX (US)

(72) Inventors: Hui Zhou, The Woodlands, TX (US); William Cecil Pearl, Spring, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/333,261

(22) Filed: May 28, 2021

(51) Int. Cl.
  *E21B 43/27* (2006.01)
  *C09K 8/74* (2006.01)
  *E21B 37/00* (2006.01)

(52) U.S. Cl.
  CPC .......... *C09K 8/74* (2013.01); *E21B 37/00* (2013.01); *E21B 43/27* (2020.05)

(58) Field of Classification Search
  CPC ........ C09K 8/528; E21B 37/00; E21B 21/003
  See application file for complete search history.

(56) References Cited

U.S. PATENT DOCUMENTS

| | | | | |
|---|---|---|---|---|
| 4,148,360 A * | 4/1979 | Watanabe | ............... | C09K 8/72 166/308.2 |
| 6,710,019 B1 * | 3/2004 | Sawdon | ............... | C09K 8/512 507/261 |
| 9,701,894 B2 | 7/2017 | Al-Nakhli et al. | | |
| 2005/0034861 A1 | 2/2005 | Saini et al. | | |
| 2007/0039733 A1 | 2/2007 | Welton et al. | | |
| 2020/0003040 A1 | 1/2020 | Weider et al. | | |
| 2021/0230476 A1 * | 7/2021 | Purdy | ............... | E21B 43/27 |

FOREIGN PATENT DOCUMENTS

| WO | WO-2010109163 A1 * | 9/2010 | ............ C09K 8/032 |
|---|---|---|---|
| WO | 2017142836 A1 | 8/2017 | |

OTHER PUBLICATIONS

Miller, Kali A., et al. "Acid-triggered, acid-generating, and self-amplifying degradable polymers." Journal of the American Chemical Society 141.7 (2019): 2838-2842.
Foreign Communication from Related Application—International Search Report and Written Opinion of the International Searching Authority, International Application No. PCT/US2022/017923, dated Jun. 9, 2022, 10 pages.

* cited by examiner

*Primary Examiner* — Silvana C Runyan
(74) *Attorney, Agent, or Firm* — Conley Rose, P.C.; Rodney B. Carroll

(57) ABSTRACT

Methods and compositions involving a strong acid precursor that generates and/or releases a strong acid for use in a subterranean formation. In some embodiments, the methods include providing a treatment fluid comprising a base fluid and a strong acid precursor and introducing the treatment fluid in a wellbore penetrating at least a portion of a subterranean formation.

20 Claims, 1 Drawing Sheet

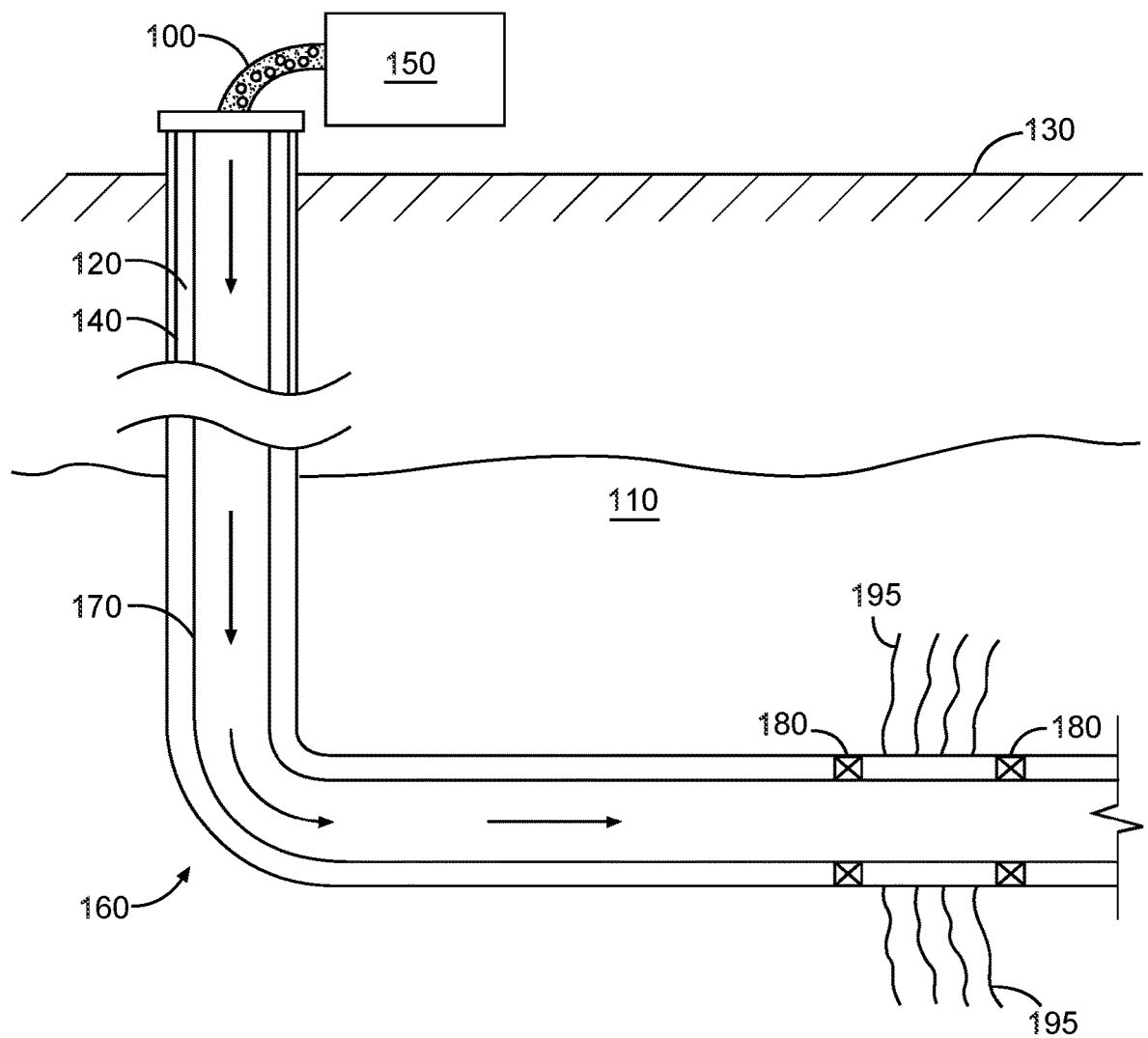

STRONG ACID PRECURSOR GENERATING STRONG ACID FOR USE DOWNHOLE IN A SUBTERRANEAN FORMATION

BACKGROUND

The present disclosure relates to methods and compositions for treating a subterranean formation.

Treatment fluids may be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein.

Some common subterranean treatment operations that employ treatment fluids are acidizing operations. Illustrative acidizing operations may include, for example, matrix acidizing, acid fracturing, scale dissolution and removal, polymer breaking, filter cake dissolution, and the like. These acidizing operations may be used to accomplish a number of purposes. Such purposes may include increasing or restoring the permeability of subterranean formations so as to facilitate the flow of oil and gas from the formation into the well. Additionally, the acid treatments may also be used to remove deposits in the formation along as much of the hydrocarbon flow path as possible and/or to create new flow paths as in matrix acidization.

Although acidizing a portion of a subterranean formation may be beneficial, conventional acidizing systems have significant drawbacks. For example, one major problem associated with conventional acidizing treatment systems is that deeper penetration into the formation is not usually achievable because, inter alia, the acid may be spent before it can deeply penetrate into the subterranean formation. The rate at which acidizing fluids react with reactive materials in the subterranean formation is a function of various factors including, but not limited to, acid strength, acid concentration, temperature, fluid velocity, mass transfer, and the type of reactive material encountered. Whatever the rate of reaction of the acidic solution, the solution can be introduced into the formation only a certain distance before it becomes spent. To combat these problems and others, it is desirable to generate and/or release a strong acid downhole for use in these and other various applications.

BRIEF DESCRIPTION OF THE DRAWINGS

These drawings illustrate certain aspects of some of the embodiments of the present disclosure and should not be used to limit or define the claims.

FIG. 1 is a diagram illustrating an example of a subterranean formation in which a treatment fluid is introduced in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for use in a subterranean formation. More particularly, the present disclosure relates to methods and compositions involving a strong acid precursor that generates and/or releases a strong acid for use in the subterranean formation.

The present disclosure provides a composition including a base fluid and a strong acid precursor. The present disclosure also provides methods that include providing a treatment fluid including a base fluid and a strong acid precursor. The methods of the present disclosure may also include introducing the treatment fluid in a wellbore penetrating at least a portion of a subterranean formation. In some embodiments, the methods may further include allowing the strong acid precursor to generate and/or release a strong acid in the subterranean formation. As used herein, the term "generate" and grammatical variants thereof shall be understood to also include the terms "release," "form," "create," and the like and grammatical variants thereof. In some embodiments, the methods may further include allowing the strong acid to acidize the portion of the subterranean formation or damage contained therein. In some embodiments, the methods may further include contacting at least a portion of a biopolymer or a filter cake located in the subterranean formation with the strong acid, wherein the portion of the biopolymer or the filter cake at least partially degrades. In some embodiments, the methods may further include introducing a catalytic acid or a catalytic acid precursor into the wellbore and contacting at least a portion of the treatment fluid with the catalytic acid or the catalytic acid precursor.

Among the many potential advantages to the methods and compositions of the present disclosure, only some of which are alluded to herein, the methods and compositions of the present disclosure may include a strong acid precursor that generates and/or releases a strong acid in situ within a subterranean formation, which may avoid the strong acid becoming prematurely spent (e.g., by reacting with the formation itself, fines, other chemicals, metal surfaces within the formation, and/or undesirable deposits nearest the wellbore) before performing its desired purpose in a desire location within the formation. In certain embodiments, the generation and/or release of the strong acid from the strong acid precursor may be delayed until the treatment fluid including the strong acid precursor reaches a desired location within the subterranean formation.

In some embodiments, the generation and/or release of the strong acid in situ within a subterranean formation may allow the strong acid to penetrate deeper into the formation than if the strong acid was introduced directly into the formation or a wellbore penetrating at least a portion of the formation. Additionally, in some embodiments, the methods and compositions of the present disclosure may provide improved uniform placement of the strong acid in the subterranean formation. For example, an entire interval in the subterranean formation may be evenly soaked with a strong acid as opposed to spot placement of the strong acid.

In certain embodiments, the strong acid that is generated and/or released in accordance with the methods and compositions of the present disclosure may be used in any suitable acidizing treatment to acidize at least a portion of a subterranean formation or one or more deposits contained therein, such as deposits that may reduce permeability. As used herein, the term "deposits" includes, but is not limited to, filter cakes, biopolymers, synthetic polymers, hydrates, surfactants (including viscoelastic surfactants), bridging agents, scale deposits, skin deposits, and geological deposits. Furthermore, in some embodiments, the methods and compositions of the present disclosure may effectively generate wormholes to stimulate production in carbonate-bearing subterranean formations, dissolve damage, and remove fines to recover production in formations at elevated temperatures.

In some embodiments, the methods and compositions of the present disclosure may also be less corrosive to tubing, casing, and other downhole equipment compared to conventional acidizing systems. Moreover, in some embodiments, the methods and compositions of the present disclosure may permit corrosion considerations to not be a limiting factor in the design of the acidizing systems. Furthermore, the methods and compositions of the present disclosure may reduce the hazards associated with acid handling for personnel and equipment. Additionally, the methods and compositions of the present disclosure may allow for the introduction of more concentrated acids, especially as compared to conventional acidizing systems.

In certain embodiments, the methods of the present disclosure may include providing a treatment fluid that includes a base fluid and a strong acid precursor. The treatment fluids prepared according to the methods and compositions of the present disclosure may include any base fluid known in the art. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods of the present disclosure may include water from any source. Such aqueous fluids may include fresh water, salt water (e.g., water containing one or more salts dissolved therein), brine (e.g., saturated salt water), seawater, or any combination thereof. In some embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the methods of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods of the present disclosure include, but are not limited to oils, hydrocarbons, organic liquids, and the like. In certain embodiments, the treatment fluids may include a mixture of one or more fluids and/or gases, including but not limited to emulsions, foams, and the like.

In certain embodiments, the strong acid precursors used in the compositions and methods of the present disclosure may be any chemical that generates and/or releases a strong acid (e.g., HCl, HI, HBr, and HF) for use downhole in a subterranean formation. In some embodiments, the strong acid precursor includes at least one compound selected from the group consisting of

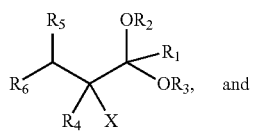
and

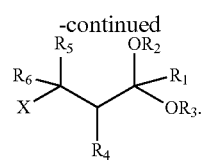

wherein each of $R_1$, $R_4$, $R_5$, and $R_6$ may be independently selected from the group consisting of: a hydrogen atom and a $C_1$ to $C_{10}$ hydrocarbon chain, wherein each of $R_2$ and $R_3$ may be independently a $C_1$ to $C_{10}$ hydrocarbon chain, and wherein X may be a halogen selected from the group consisting of fluorine, chlorine, bromine, and iodine. As used herein, a "hydrocarbon chain" may, unless otherwise specifically noted, be branched, unbranched, non-cyclic, and/or cyclic; it may be substituted or unsubstituted (that is, it may or may not contain one or more additional moieties or functional groups in place of one or more hydrogen atoms in the hydrocarbon chain); it may be saturated or unsaturated; and/or it may be bonded to at least one other hydrocarbon chain. Furthermore, as used herein, the nomenclature "$C_x$ to $C_y$" refers to the number of carbon atoms in the hydrocarbon chain (here, ranging from x to y carbon atoms). As used herein, "independently" refers to the notion that the preceding items may be the same or different. As used herein, the term "substituted" refers to one or more of the hydrogen atoms in the hydrocarbon chain being replaced by one or more functional groups. In such embodiments, the hydrocarbon chain may be substituted with one or more functional groups selected from the group consisting of an ether, an ester, a hydroxyl, an alkane, an alkene, an alkyne, and any combination thereof.

In certain embodiments, two or more of $R_1$, $R_2$, $R_3$, $R_4$, $R_5$, and/or $R_6$ may be a $C_1$ to $C_{10}$ hydrocarbon chain and may be bonded together. In some embodiments, two or more of $R_1$, $R_2$, and/or $R_3$ may be a $C_1$ to $C_{10}$ hydrocarbon chain and may be bonded together. In some embodiments, two or more of $R_4$, $R_5$, and/or $R_6$ may be a $C_1$ to $C_{10}$ hydrocarbon chain and may be bonded together. In such embodiments, the bonding together of two or more of $R_1$, $R_2$, $R_3$, $R_4$, $R_5$, and/or $R_6$ may result in the formation of a cyclic structure. In such embodiments, the cyclic structure may include a $C_2$ to $C_{10}$ hydrocarbon chain. Examples of strong acid precursor compounds of the present disclosure in which $R_2$ and $R_3$ are bonded together to form a cyclic structure include, but are not limited to:

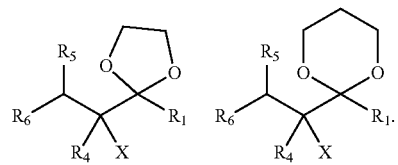

In some embodiments, each of $R_1$, $R_4$, $R_5$, and $R_6$ may be a hydrogen. In some embodiments, the length of the hydrocarbon chains for each of $R_1$, $R_2$, $R_3$, $R_4$, $R_5$, and $R_6$ may independently range between $C_1$ to $C_2$, $C_1$ to $C_3$, $C_1$ to $C_4$, $C_1$ to $C_5$, $C_1$ to $C_6$, $C_1$ to $C_7$, $C_1$ to $C_8$, $C_1$ to $C_9$, and, $C_1$ to $C_{10}$. In some embodiments, the shorter chain lengths and/or the inclusion of hydroxyl groups, may increase the water solubility of the strong acid precursor, among other reasons, to promote the generation and/or release of a strong acid.

In certain embodiments, the strong acid precursor may be present in the treatment fluids of the present disclosure in an amount sufficient to generate and/or release the desired amount of strong acid. In certain embodiments, the strong acid precursor may be present in the treatment fluid in an amount from about 0.1% to about 50% by volume of the treatment fluid. A person skilled in the art, with the benefit of this disclosure, will appreciate the amount of the strong acid precursor used in the treatment fluid may vary depending upon the application of the treatment fluid. As described elsewhere herein, in certain embodiments, the treatment fluids of the present disclosure may be used in acidizing applications. In some such embodiments, the strong acid precursor may be present in the treatment fluid in an amount from about 1% to about 50% by volume of the treatment fluid. In other such embodiments, the strong acid precursor may be present in the treatment fluid in an amount from about 3% to about 40% by volume of the treatment fluid. In yet other such embodiments, the strong acid precursor may be present in the treatment fluid in an amount from about 5% to about 20% by volume of the treatment fluid.

As described elsewhere herein, in certain embodiments, the treatment fluids of the present disclosure may be used in other applications, including, but not limited to, reducing the viscosity of a viscosified fracturing fluid. In some such embodiments, the strong acid precursor may be present in the treatment fluid in an amount from about 0.1% to about 10% by volume of the treatment fluid. In other such embodiments, the strong acid precursor may be present in the treatment fluid in an amount from about 0.5% to about 7% by volume of the treatment fluid. In yet other such embodiments, the strong acid precursor may be present in the treatment fluid in an amount from about 1% to about 5% by volume of the treatment fluid.

In certain embodiments, the treatment fluids used in the methods and compositions of the present disclosure may include one or more polar organic solvents. In such embodiments, the polar organic solvent may improve the solubility of the strong acid precursor in aqueous base fluids. Organic polar solvents that may be suitable for use in certain embodiments of the present disclosure include alcohols, glycols, glycol ethers, esters, amides, and their derivatives. Examples of organic polar solvents include, but are not limited to, methanol, ethanol, isopropanol, n-butanol, iso-butanol, tert-butanol, ethylene glycol, polyethylene glycol, propylene glycol, butanediol, pentanediol, glycerol, polyglycerol, 2-pyrrolidone, N-methyl-2-pyrrolidone, ethylene glycol monobutyl ether, polyglycol ethers, and combination thereof.

In certain embodiments, the polar organic solvent may be present in the treatment fluid in an amount up to about 70% by volume of the treatment fluid. In other embodiments, the polar organic solvent may be present in the treatment fluid in an amount from about 1% to about 50% by volume of the treatment fluid. In other embodiments, the polar organic solvent may be present in the treatment fluid in an amount from about 2% to about 40% by volume of the treatment fluid. In other embodiments, the polar organic solvent may be present in the treatment fluid in an amount from about 5% to about 30% by volume of the treatment fluid.

In certain embodiments, the treatment fluids used in the methods and compositions of the present disclosure may include one or more surfactants. Surfactants that may be suitable for use in certain embodiments of the present disclosure include cationic, anionic, zwitterionic, and nonionic surfactants. Examples of cationic surfactants that may be suitable for use in certain embodiments of the present disclosure include, but are not limited to, alkyl amines, alkyl amine salts, quaternary ammonium salts such as trimethyl-tallowammonium halides (e.g., trimethyltallowammonium chloride, trimethyltallowammonium bromide), amine oxides, alkyltrimethyl amines, triethyl amines, alkyldimethylbenzylamines, cetyltrimethylammonium bromide, alkyl dimethyl benzyl-ammonium chloride, trimethylcocoammonium chloride, derivatives thereof, and any combination thereof. Examples of anionic surfactants that may be suitable for use in certain embodiments of the present disclosure include, but are not limited to, alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, $C_8$ to $C_{22}$ alkylethoxylate sulfate, alkylphenol ethoxylate sulfate (or salts thereof), monoalkylphosphates, polyalkylphosphates, fatty acids, alkali salts of fatty acids, glyceride sulfates, sodium salts of fatty acids, soaps, derivatives thereof, and combinations thereof. Examples of amphoteric or zwitterionic surfactants that may be suitable for use in certain embodiments of the present disclosure include, but are not limited to, dihydroxyl alkyl glycinate, alkyl ampho acetate or propionate, alkyl betaine, alkyl amidopropyl betaine and alkylimino mono- or di-propionates derived from certain waxes, fats and oils. Examples of nonionic surfactants that may be suitable for use in certain embodiments of the present disclosure include, but are not limited to, alcohol oxylalkylates, alkyl phenol oxylalkylates, nonionic esters such as sorbitan esters, alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylate, derivatives thereof, and any combination thereof. A person of skill in the art with the benefit of the present disclosure will understand how to select such surfactants that may be suitable for a particular application of the methods and compositions of the present disclosure.

In certain embodiments, the surfactant may be present in the treatment fluid in an amount up to about 2.0% by volume of the treatment fluid. In other embodiments, the surfactant may be present in the treatment fluid in an amount from about 0.01% to about 2.0% by volume of the treatment fluid. In other embodiments, the surfactant may be present in the treatment fluid in an amount from about 0.2% to about 1.5% by volume of the treatment fluid. In other embodiments, the surfactant may be present in the treatment fluid in an amount from about 0.5% to about 1.0% by volume of the treatment fluid.

In certain embodiments, the treatment fluids used in the methods and compositions of the present disclosure may include one or more corrosion inhibitors. Corrosion inhibitors that may be suitable for use in certain embodiments of the present disclosure include any surfactant that is capable of inhibiting corrosion of metal surfaces (e.g., a film forming corrosion inhibitor). In certain embodiments, the corrosion inhibitor may include a hydrophilic moiety, and the hydrophilic moiety may include a quaternary amine, imine, amide, imidazoline, pyridine, carboxylic acid, phosphate ester, thiol group, or any salt of any of the foregoing. In certain embodiments, the hydrophilic moiety may be attached to one or more hydrocarbon chains having hydrophobic properties. Each hydrocarbon chain may independently include from about 8 to about 22 carbons and may be linear or branched, cyclic or acyclic, and/or saturated or unsaturated. Each hydrocarbon chain may be independently substituted with a functional group including one or more of: ether, ester, hydroxyl, alkane, alkene, alkyne and any combination thereof. In certain embodiments, the corrosion inhibitor may be a film forming corrosion inhibitor.

In certain embodiments, the corrosion inhibitor may be present in the treatment fluid in an amount up to about 2.0% by volume of the treatment fluid. In other embodiments, the corrosion inhibitor may be present in the treatment fluid in an amount from about 0.01% to about 2.0% by volume of the treatment fluid. In other embodiments, the corrosion inhibitor may be present in the treatment fluid in an amount from about 0.2% to about 1.5% by volume of the treatment fluid. In other embodiments, the corrosion inhibitor may be present in the treatment fluid in an amount from about 0.5% to about 1.0% by volume of the treatment fluid.

In certain embodiments, the treatment fluids prepared according to the methods and compositions of the present disclosure optionally may include any number of additional additives. Examples of such additives include, but are not limited to, buffering agents, salts, acids, diverting agents, fluid loss control additives, gas, nitrogen, carbon dioxide, surface modifying agents, tackifying agents, foamers, scale inhibitors, emulsifiers, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, viscosifying/gelling agents, breakers, weighting agents, relative permeability modifiers, resins, wetting agents, coating enhancement agents, filter cake removal agents, antifreeze agents (e.g., ethylene glycol), proppant particles, and the like. A person skilled in the art, with the benefit of this disclosure, will recognize the types of additives that may be included in the fluids of the present disclosure for a particular application.

In certain embodiments, the methods of the present disclosure may include introducing the treatment fluid including one or more strong acid precursors of the present disclosure into a wellbore penetrating at least a portion of a subterranean formation. In certain embodiments of the present disclosure, the methods of the present disclosure may also include allowing the one or more strong acid precursors of the present disclosure to generate and/or release a strong acid in the subterranean formation. Without being limited to any particular theory or mechanism, it is believed that the strong acid precursor may generate and/or release strong acid according to the following reaction sequences when in the presence of water (e.g., from the treatment fluid or from the subterranean formation):

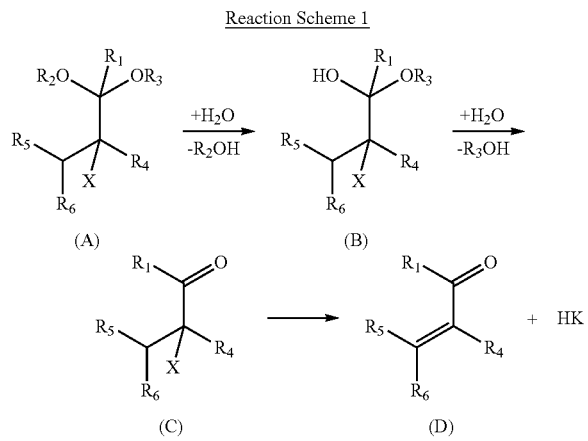

Reaction Scheme 1

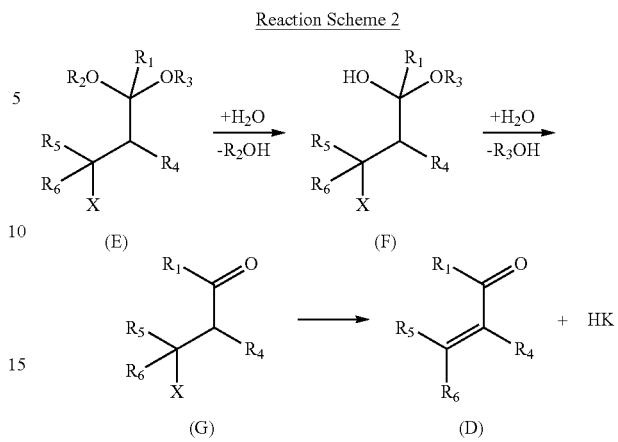

Reaction Scheme 2

In some embodiments, the treatment fluid may include an aqueous base fluid and the strong acid precursor, and the strong acid precursor may generate and/or release a strong acid in the treatment fluid. In other embodiments, the treatment fluid may include a non-aqueous base fluid and the strong acid precursor. In such embodiments, at least a portion of the treatment fluid may contact an aqueous fluid located in the wellbore and/or subterranean formation, and the strong acid precursor may generate and/or release a strong acid in the presence of that aqueous fluid.

As shown in each of the reaction sequences above, in certain embodiments, the strong acid precursor may be an acetal or a ketal (A or E) that hydrolyzes to a hemiacetal or a hemiketal (B or F) and then further to an aldehyde or a ketone (C or G), which subsequently undergoes β-elimination to generate and/or release stoichiometric amounts of a strong acid (e.g., HX) and an α,β-unsaturated aldehyde or an α,β-unsaturated ketone (D). A person skilled in the art, with the benefit of this disclosure, will recognize that the strong acid precursor shown in (A) and (E) in the above reaction sequences may be an acetal if $R_1$ is a hydrogen atom or may be a ketal if $R_1$ is a $C_1$ to $C_{10}$ hydrocarbon chain.

A person skilled in the art, with the benefit of this disclosure, will recognize that the rate of β-elimination for the aldehyde or ketone (C or G) decreases based on the halogen X in the following order I>Br>Cl>F, with iodide having the highest rate of β-elimination and fluoride having the lowest rate off β-elimination. In certain embodiments, it may be desirable to select a particular halogen based on the rate of β-elimination in order to control the timing of the generation and/or release of the strong acid. In certain embodiments, a halogen having higher rate of β-elimination may be used instead of a halogen having a lower rate of β-elimination, for example, iodide or bromide instead of chlorine or fluorine, in order to achieve a faster generation and/or release of the strong acid. In other embodiments, a halogen having lower rate of β-elimination may be used instead of a halogen having a higher rate of β-elimination, for example, chlorine or fluorine instead of iodide or bromide, in order to achieve a slower or delayed generation and/or release of the strong acid.

In certain embodiments, the hydrolysis shown in the above reaction sequence may be amplified under mildly acidic condition (e.g., pH less than 7). Accordingly, once the strong acid starts to generate and/or release, the hydrolysis shown in the above reaction sequence may become self-amplifying due to the presence of $H^+$ in the fluid containing the strong acid precursor. In certain embodiments, the hydrolysis shown in the above reaction sequence may be initiated and/or accelerated through the introduction of a catalytic acid or a catalytic acid precursor, which may lower the pH of the fluid containing the strong acid precursor. In certain embodiments, the hydrolysis shown in the above reaction sequence may be initiated and/or accelerated by a change in temperature of the fluid containing the strong acid precursor (e.g., due to the temperature of the subterranean formation).

In certain embodiments, it may be desirable to speed up the generation and/or release of the strong acid. In such embodiments, the methods of the present disclosure may include introducing a catalytic acid or a catalytic acid precursor into the wellbore. In some embodiments, the catalytic acid or the catalytic acid precursor may be introduced separately from the treatment fluid. In such embodiments, the catalytic acid or the catalytic acid precursor may contact the treatment fluid (or other fluid within the subterranean formation containing the strong acid precursor) and initiate and/or accelerate hydrolysis of the strong acid precursor, resulting in the generation and/or release of a strong acid. In other embodiments, the catalytic acid or the catalytic acid precursor may be included in the treatment fluid and introduced into the wellbore at the same time as the strong acid precursor. In such embodiments, the catalytic acid or the catalytic acid precursor may initiate and/or accelerate hydrolysis of the strong acid precursor, thereby resulting in the generation and/or release of a strong acid shortly after the introduction of the treatment fluid into the wellbore.

Examples of catalytic acids suitable for certain embodiments of the present disclosure include, but are not limited to, inorganic acids, sulphuric acid, sulfamic acid, acidic anhydrides, boric acid, boron trihalides, organoboranes, aluminum hydroxide, aluminum trihalides, trimethylaluminum, zinc dichloride, titanium tetrachloride, tin dichloride, tin tetrachloride, ferric chloride, organic acids, formic acid, acetic acid, monochloroacetic acid, dichloroacetic acid, trichloroacetic acid, sulfinic acids, sulfonic acids, methanesulfonic acid, p-toluenesulfonic acid, lactic acid, glycolic acid, oxalic acid, propionic acid, butyric acid, and any combination thereof. Examples of catalytic acid precursors suitable for certain embodiments of the present disclosure include, but are not limited to, orthoesters, polyorthoesters, organic esters of carboxylic acids (e.g., formates, acetates, propanoates, lactates), sulfonates, and sulfates. In certain embodiments, the catalytic acid or the catalytic acid precursor may be introduced in an amount from about 0.01% to about 5% by volume of the treatment fluid. In some embodiments, the catalytic acid or the catalytic acid precursor may be introduced in an amount from about 0.1% to about 5% by volume of the treatment fluid. In other embodiments, the catalytic acid or the catalytic acid precursor may be introduced in an amount from about 0.5% to about 3% by volume of the treatment fluid.

In certain embodiments, the strong acid precursor used in the methods and compositions of the present disclosure may generate and/or release a strong acid when exposed to a certain temperature (e.g., in a subterranean formation). In certain embodiments, the strong acid precursor may generate and/or release a strong acid in a subterranean formation having a temperature of from about 20° C. (68° F.) to about 204° C. (400° F.). In some embodiments, the strong acid precursor may generate and/or release a strong acid in a subterranean formation having a temperature of from about 20° C. (68° F.) to about 177° C. (350° F.). In other embodiments, the strong acid precursor may generate and/or release a strong acid in a subterranean formation having a temperature of at least 20° C. (68° F.). In other embodiments, the strong acid precursor may generate and/or release a strong acid in a subterranean formation having a temperature as low as any of 25, 30, 35, 40, 45, 50, 55, 60, 65, 70, 75, 80, 85, 90, 95, 100, 105, 110, 115, 120, 125, and 130° C.

In certain embodiments, it may be desirable to slow down the generation and/or release of the strong acid to, for example, provide a desired time delay. In such embodiments, the methods of the present disclosure may include introducing a base into the wellbore. In some embodiments, the base may be introduced separately from the treatment fluid. In such embodiments, the base may contact the treatment fluid (or other fluid within the subterranean formation containing the strong acid precursor) and reduce the pH of the fluid, thereby slowing the generation and/or release of the strong acid. In other embodiments, the base may be included in the treatment fluid and introduced into the wellbore at the same time as the strong acid precursor. In such embodiments, the treatment fluid may have an initial pH of about 7.0 or greater. In some embodiments, the treatment fluid may have an initial pH of from about 7.0 to about 14.0. In some embodiments, the treatment fluid may have an initial pH of from about 8.0 to about 13.0. In other embodiments, the treatment fluid may have an initial pH of from about 9.0 to about 13.0.

Examples of bases suitable for certain embodiments of the present disclosure include, but are not limited to, inorganic bases, alkali metal or alkaline earth metal oxides, alkali metal or alkaline earth metal hydroxides, alkali metal or alkaline earth metal carbonates, alkali metal or alkaline earth metal bicarbonates, ammonia, organic bases, ammonium hydroxides, tetramethylammonium hydroxide, amines, pyridines, imidazoles, and any combination thereof. In certain embodiments, the base may be introduced in an amount from about 0.01% to about 10% by volume of the treatment fluid. In some embodiments, the base may be introduced in an amount from about 0.1% to about 5% by volume of the treatment fluid. In other embodiments, the base may be introduced in an amount from about 1% to about 5% by volume of the treatment fluid.

In certain embodiments, the pH of the treatment fluid may decrease after being introduced into the wellbore. In some embodiments, the pH of the treatment fluid may further decrease as time progresses after the introduction of the treatment fluid into the wellbore, for example, as strong acid is generated and/or released from the strong acid precursor. In certain embodiments, the pH of the treatment fluid may be about 3 or less after the treatment fluid is introduced into the wellbore. In certain embodiments, the pH of the treatment fluid may be about 3 or less within about 2 hours after the treatment fluid is introduced into the wellbore. In some embodiments, the pH of the treatment fluid may be about 3 or less within about 24 hours after the treatment fluid introduced into the wellbore. In other embodiments, the pH of the treatment fluid may be about 3 or less within about 72 hours after the treatment fluid is introduced into the wellbore. In other embodiments, the pH of the treatment fluid may be about 3 or less within about 5 days after the treatment fluid is introduced into the wellbore.

In some embodiments, the methods and compositions of the present disclosure may be used during or in conjunction with any subterranean operation. For example, the methods and compositions of the present disclosure may be used in the course of and/or after drilling operations in which a wellbore has been drilled to penetrate a subterranean formation. In certain embodiments, the treatment fluid of the present disclosure may be introduced into and/or circulated in the wellbore after drilling to contact a biopolymer in the wellbore and/or subterranean formation, among other purposes, to at least partially degrade and/or remove one or more portions of the biopolymer. Examples of suitable biopolymers include, but are not limited to, xanthan gum, scleroglucan gum, diutan gum, guar gum, Whelan gum, and derivatives thereof, such as hydroxypropyl guar and carboxymethylhydroxypropyl guar, cellulose derivatives, such as hydroxyethylcellulose, carboxymethylcellulose, polyanionic cellulose, and starch and its derivatives, such as pregelatinized starch and crosslinked starch, and any combinations thereof. In certain embodiments, this may be accomplished using the pumping system and equipment used to circulate the treatment fluid in the wellbore.

In another embodiment, the treatment fluids of the present disclosure may be introduced into and/or circulated in the wellbore after drilling to contact a filter cake deposited on the walls of the wellbore and/or in the subterranean formation, among other purposes, to at least partially degrade and/or remove one or more portions of the filter cake. In another embodiment, the treatment fluids of the present disclosure may be used just prior to placing cement and/or casing in the wellbore, among other reasons, in order to remove a filter cake from the wellbore. In such embodiments, the treatment fluids of the present disclosure may be continuously pumped down the casing or pipe and upwardly through an annulus in the wellbore in contact with the filter cake as a pre-flush just prior to introducing a spacer fluid and a cement slurry into the annulus. In some embodiments, the quantity of the treatment fluids of the present disclosure pumped through the annulus prior to when the cement slurry is introduced therein (as well as other compositions used to dissolve components of the filter cake) may be a predetermined quantity calculated to remove substantially all of the filter cake, which may provide for a more successful and efficient cementing job.

In other embodiments, the treatment fluids of the present disclosure may be used in the course of a stimulation treatment. In such embodiments, the treatment fluids of the present disclosure may be introduced into a portion of a subterranean formation where it may be allowed to contact at least a portion of the subterranean formation and at least partially dissolve carbonate minerals therein so as to create one or more voids in the subterranean formation. Introduction of the treatment fluid may, in certain embodiments, be carried out at or above a pressure sufficient to create or enhance one or more fractures within the subterranean formation. In other embodiments, introduction of the treatment fluid may be carried out at a pressure below that which would create or enhance one or more fractures within the subterranean formation.

In other embodiments, the treatment fluid of the present disclosure may be used in the course of a fracturing treatment. In certain embodiments, the treatment fluids of the present disclosure may be introduced into a portion of a subterranean formation (e.g., one or more fractures) containing a viscosified fracturing fluid. In such embodiments, at least a portion of the treatment fluid may contact the viscosified fracturing fluid to at least partially reduce the viscosity of the fracturing fluid. In some embodiments, the viscosified fracturing fluid may include proppants, and the proppants may be deposited within the subterranean formation, for example, within one or more fracture, as the viscosity of the fracturing fluid is at least partially reduced.

Other suitable subterranean operations in which the methods and/or compositions of the present disclosure may be used include, but are not limited to, pre-flush treatments, after-flush treatments, hydraulic fracturing treatments, sand control treatments (e.g., gravel packing), "frac-pack" treatments, wellbore clean-out treatments, stuck pipe treatments, filter cake removal treatments, skin remediation treatments, and other operations where a treatment fluid may be useful. In certain embodiments, the methods and compositions of the present disclosure may also be used in cleaning operations or treatments conducted at the surface that are used to clean or prepare equipment or other components that are subsequently used in subterranean operations.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the strong acid precursor and/or other components of the treatment fluid may be metered directly into a base fluid to form a treatment fluid. In certain embodiments, the base fluid may be mixed with the strong acid precursor and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

Certain embodiments of the methods and compositions disclosed herein may directly or indirectly affect one or more components or pieces of equipment associated with the preparation, delivery, recapture, recycling, reuse, and/or disposal of the disclosed compositions. For example, with reference to FIG. 1, the disclosed methods and compositions may directly or indirectly affect one or more components or pieces of equipment associated with an example of a well and treatment system, according to one or more embodiments. Referring now to FIG. 1, a well 160 is shown during an operation according to certain embodiments of the present disclosure in a portion of a subterranean formation of interest 110 surrounding a wellbore 120. The subterranean formation of interest 110 may include acid-soluble components. The subterranean formation may be a carbonate formation, sandstone formation, mixed carbonate-sandstone formation, or any other subterranean formation suitable for an acidizing treatment. The wellbore 120 extends from the surface 130 and through a portion of the subterranean formation 110 surrounding the horizontal portion of the wellbore. Although shown as vertical deviating to horizontal, the wellbore 120 may include horizontal, vertical, slant, curved, and other types of wellbore geometries and orientations, and the treatment may be applied to a subterranean zone surrounding any portion of the wellbore. The wellbore 120 can include a casing 140 that is cemented or otherwise secured to the wellbore wall. The wellbore 120 can be uncased or include uncased sections. Perforations can be formed in the casing 140 to allow fluids and/or other materials to flow into the subterranean formation 110. In cased wells, perforations can be formed using shape charges, a perforating gun, hydro-jetting and/or other tools.

The well is shown with a work string 170 depending from the surface 130 into the wellbore 120. A pump and blender system 150 is coupled to the work string 170 to pump the treatment fluid 100 into the wellbore 120. The working string 170 may include coiled tubing, jointed pipe, and/or other structures that allow fluid to flow into the wellbore 120. The working string 170 can include flow control devices, bypass valves, ports, and or other tools or well devices that control a flow of fluid from the interior of the working string 170 into the subterranean zone 110. For example, the working string 170 may include ports adjacent the wellbore wall to communicate the treatment fluid 100 directly into the subterranean formation 110, and/or the working string 170 may include ports that are spaced apart from the wellbore wall to communicate the treatment fluid 100 into an annulus in the wellbore 120 between the working string 170 and the wellbore wall.

The working string 170 and/or the wellbore 120 may include one or more sets of packers 180 that seal the annulus between the working string 170 and wellbore 120 and/or a downhole portion of the wellbore 120 to define an interval of the wellbore 120 into which particulate materials and/or treatment fluids will be pumped.

As shown, the wellbore 120 penetrates a portion 110 of the subterranean formation, which may include a hydrocarbon-bearing reservoir. In some cases, a treatment fluid 100 may be pumped through the working string 170 and into the portion 110 of the formation. In some embodiments, the treatment fluid 100 may create wormholes 195 in the portion 110 of the subterranean formation.

In some embodiments, the injection of the treatment fluid 100 may be monitored at the well site. In some embodiments, wellbore conditions may be monitored during injection. Examples of wellbore conditions that may be suitable for use in the methods of the present disclosure include, but are not limited to, temperature, pressure, skin, fluid distribution, flow rate, pH, any physical or chemical property of the formation or formation fluids, and any combination thereof. For example, in certain embodiments, the injection rate could be updated with the methods of the present disclosure during injection using conditions such as fluid distribution and wellbore pressure.

In some embodiments, wellbore conditions of the present disclosure could be measured by sensors. In certain embodiments, sensors could be located in the wellbore. For purposes of this disclosure, the term "sensors" is understood to include sources (to emit and/or transmit energy and/or signals), receivers (to receive and/or detect energy and/or signals), and transducers (to operate as a source and/or receiver). In certain embodiments, information from the sensors may be fed into a system or tool that can determine an injection rate or rate profile according to the methods of the present disclosure.

It is also to be recognized that the disclosed treatment fluids may directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above in FIG. 1.

An embodiment of the present disclosure is a method that includes: providing a treatment fluid comprising a base fluid and a strong acid precursor, wherein the strong acid precursor comprises at least one compound selected from the group consisting of:

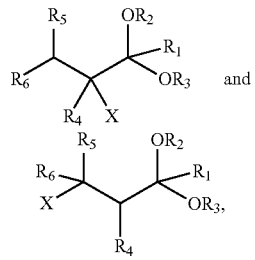

wherein each of $R_1$, $R_4$, $R_5$, and $R_6$ is independently selected from the group consisting of: a hydrogen atom and a $C_1$ to $C_{10}$ hydrocarbon chain, wherein each of $R_2$ and $R_3$ is independently a $C_1$ to $C_{10}$ hydrocarbon chain, and wherein X is a halogen selected from the group consisting of fluorine, chlorine, bromine, and iodine; and introducing the treatment fluid in a wellbore penetrating at least a portion of a subterranean formation.

In one or more embodiments described in the preceding paragraph, the strong acid precursor generates a strong acid in the subterranean formation, wherein the strong acid is HX. In one or more embodiments described in the preceding paragraph, two or more of $R_1$, $R_2$, $R_3$, $R_4$, $R_5$, and $R_6$ are bonded together. In one or more embodiments described in the preceding paragraph, allowing the strong acid to acidize the portion of the subterranean formation or damage contained therein. In one or more embodiments described in the preceding paragraph, contacting at least a portion of a biopolymer or a filter cake located in the subterranean formation with the strong acid, wherein the portion of the biopolymer or the filter cake at least partially degrades. In one or more embodiments described in the preceding paragraph, introducing a catalytic acid or a catalytic acid precursor into the wellbore; and contacting at least a portion of the treatment fluid with the catalytic acid or the catalytic acid precursor. In one or more embodiments described in the preceding paragraph, the subterranean formation has a temperature of about 68° F. or more. In one or more embodiments described in the preceding paragraph, the treatment fluid has a pH of about 7 or greater when introduced into the wellbore, and wherein the pH of the treatment fluid is about 3 or less within about 2 hours after being introduced into the wellbore. In one or more embodiments described in the preceding paragraph, the treatment fluid is introduced in the wellbore using at least one pump.

Another embodiment of the present disclosure is a method that includes: providing a treatment fluid comprising an aqueous base fluid and a strong acid precursor, wherein the strong acid precursor comprises at least one compound selected from the group consisting of

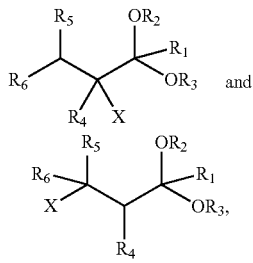

and wherein each of $R_1$, $R_4$, $R_5$, and $R_6$ is independently selected from the group consisting of: a hydrogen atom and a $C_1$ to $C_{10}$ hydrocarbon chain, wherein each of $R_2$ and $R_3$ is independently a $C_1$ to $C_{10}$ hydrocarbon chain, and wherein X is a halogen selected from the group consisting of fluorine, chlorine, bromine, and iodine; introducing the treatment fluid in a wellbore penetrating at least a portion of a subterranean formation comprising carbonate minerals; and allowing the strong acid precursor to generate a strong acid.

In one or more embodiments described in the preceding paragraph, allowing the strong acid to dissolve at least a portion of the carbonate minerals in the subterranean formation. In one or more embodiments described in the preceding paragraph, contacting at least a portion of a biopolymer or a filter cake located in the subterranean formation with the strong acid, wherein the portion of the biopolymer or the filter cake at least partially degrades. In one or more embodiments described in the preceding paragraph, the biopolymer is selected from the group consisting of: xanthan gum, scleroglucan gum, diutan gum, guar gum, Whelan gum, hydroxypropyl guar, carboxymethylhydroxypropyl guar, cellulose, hydroxyethylcellulose, carboxymethylcellulose, polyanionic cellulose, starch, pregelatinized starch, crosslinked starch, and any combinations thereof. In one or more embodiments described in the preceding paragraph, introducing a catalytic acid or a catalytic acid precursor into the wellbore; and contacting at least a portion of the treatment fluid with the catalytic acid or the catalytic acid precursor.

Another embodiment of the present disclosure is a composition that includes: a base fluid; and a strong acid precursor that comprises at least one compound selected from the group consisting of:

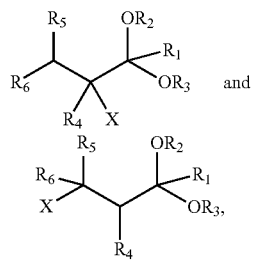

wherein each of $R_1$, $R_4$, $R_5$, and $R_6$ is independently selected from the group consisting of: a hydrogen atom and a $C_1$ to $C_{10}$ hydrocarbon chain, wherein each of $R_2$ and $R_3$ is independently a $C_1$ to $C_{10}$ hydrocarbon chain, and wherein X is a halogen selected from the group consisting of fluorine, chlorine, bromine, and iodine.

In one or more embodiments described in the preceding paragraph, two or more of $R_1$, $R_2$, $R_3$, $R_4$, $R_5$, and $R_6$ are bonded together. In one or more embodiments described in the preceding paragraph, the strong acid precursor is present in the composition in a concentration of from about 1% to about 20% by volume of the composition. In one or more embodiments described in the preceding paragraph, the composition comprises an additive chosen from the group consisting of: surfactants, corrosion inhibitors, buffering agents, salts, acids, diverting agents, fluid loss control additives, gas, nitrogen, carbon dioxide, surface modifying agents, tackifying agents, foamers, scale inhibitors, emulsifiers, catalysts, clay stabilizers, shale inhibitors, biocides, friction reducers, antifoam agents, bridging agents, flocculants, $H_2S$ scavengers, $CO_2$ scavengers, oxygen scavengers, lubricants, hydrocarbons, gelling agents, breakers, weighting agents, relative permeability modifiers, resins, wetting agents, coating enhancement agents, filter cake removal agents, antifreeze agents, proppant particles, and combinations thereof. In one or more embodiments described in the preceding paragraph, a catalytic acid or a catalytic acid precursor. In one or more embodiments described in the preceding paragraph, the catalytic acid or the catalytic acid precursor is present in the composition in a concentration of from about 0.01% to about 5% by volume of the composition.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid comprising a base fluid and an acid precursor, wherein the acid precursor comprises at least one compound selected from the group consisting of

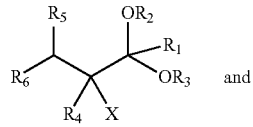

and

-continued

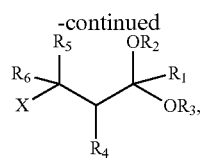

wherein each of $R_1$, $R_4$, $R_5$, and $R_6$ is independently selected from the group consisting of a hydrogen atom and a $C_1$ to $C_{10}$ hydrocarbon chain, wherein each of $R_2$ and $R_3$ is independently a $C_1$ to $C_{10}$ hydrocarbon chain, and wherein X is a halogen selected from the group consisting of fluorine, chlorine, bromine, and iodine; and introducing the treatment fluid in a wellbore penetrating at least a portion of a subterranean formation.

2. The method of claim 1, wherein the acid precursor generates an acid in the subterranean formation, wherein the acid is HX.

3. The method of claim 1, wherein two or more of $R_1$, $R_2$, $R_3$, $R_4$, $R_5$, and $R_6$ are bonded together.

4. The method of claim 2, further comprising allowing the acid to acidize the portion of the subterranean formation or damage contained therein.

5. The method of claim 2, further comprising contacting at least a portion of a biopolymer or a filter cake located in the subterranean formation with the acid, wherein the portion of the biopolymer or the filter cake at least partially degrades.

6. The method of claim 1, further comprising: introducing a catalytic acid or a catalytic acid precursor into the wellbore; and contacting at least a portion of the treatment fluid with the catalytic acid or the catalytic acid precursor.

7. The method of claim 1, wherein the subterranean formation has a temperature of about 68° F. or more.

8. The method of claim 2, wherein the treatment fluid has a pH of about 7 or greater when introduced into the wellbore, and wherein the pH of the treatment fluid is about 3 or less within about 2 hours after being introduced into the wellbore.

9. The method of claim 1, wherein the treatment fluid is introduced in the wellbore using at least one pump.

10. The method of claim 1, wherein the acid precursor is present in the treatment fluid in an amount from about 1% to about 50% by volume of the treatment fluid.

11. The method of claim 1, wherein the acid precursor is present in the treatment fluid in an amount from about 0.1% to about 10% by volume of the treatment fluid.

12. A method comprising:
providing a treatment fluid comprising an aqueous base fluid and an acid precursor, wherein the acid precursor comprises at least one compound selected from the group consisting of

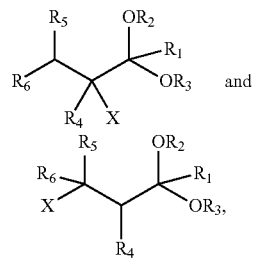

wherein each of $R_1$, $R_4$, $R_5$, and $R_6$ is independently selected from the group consisting of a hydrogen atom and a $C_1$ to $C_{10}$ hydrocarbon chain, wherein each of $R_2$ and $R_3$ is independently a $C_1$ to $C_{10}$ hydrocarbon chain, and wherein X is a halogen selected from the group consisting of fluorine, chlorine, bromine, and iodine;

introducing the treatment fluid in a wellbore penetrating at least a portion of a subterranean formation comprising carbonate minerals; and allowing the acid precursor to generate an acid.

13. The method of claim 12, further comprising allowing the acid to dissolve at least a portion of the carbonate minerals in the subterranean formation.

14. The method of claim 12, further comprising contacting at least a portion of a biopolymer or a filter cake located in the subterranean formation with the acid, wherein the portion of the biopolymer or the filter cake at least partially degrades.

15. The method of claim 14, wherein the biopolymer is selected from the group consisting of xanthan gum, scleroglucan gum, diutan gum, guar gum, Whelan gum, hydroxypropyl guar, carboxymethylhydroxypropyl guar, cellulose, hydroxyethylcellulose, carboxymethylcellulose, polyanionic cellulose, starch, pregelatinized starch, crosslinked starch, and any combinations thereof.

16. The method of claim 12, further comprising: introducing a catalytic acid or a catalytic acid precursor into the wellbore; and contacting at least a portion of the treatment fluid with the catalytic acid or the catalytic acid precursor.

17. The method of claim 12, wherein the acid is HX.

18. The method of claim 12, wherein the treatment fluid has a pH of about 7 or greater when introduced into the wellbore, and wherein the pH of the treatment fluid is about 3 or less within about 2 hours after being introduced into the wellbore.

19. The method of claim 12, wherein two or more of $R_1$, $R_2$, $R_3$, $R_4$, $R_5$, and $R_6$ are bonded together.

20. The method of claim 12, wherein the subterranean formation has a temperature of about 68° F. or more.

* * * * *